United States Patent [19]

Morgan, III

[11] Patent Number: 4,637,424

[45] Date of Patent: Jan. 20, 1987

[54] PROBELESS FLUID LEVEL CONTROLLER

[76] Inventor: Charles L. Morgan, III, P.O. Box 739, Katy, Tex. 77492-0739

[21] Appl. No.: 738,015

[22] Filed: May 23, 1985

[51] Int. Cl.⁴ ........................ F16K 31/02; G01F 23/00
[52] U.S. Cl. .................................. 137/392; 73/304 R; 156/330; 427/386
[58] Field of Search ....................... 137/392; 73/304 R; 156/330; 427/386

[56] References Cited

U.S. PATENT DOCUMENTS

| | | | |
|---|---|---|---|
| 1,699,143 | 1/1929 | Hill | 137/392 |
| 3,464,854 | 9/1969 | Bolger | 427/386 |
| 3,496,119 | 2/1970 | Weller et al. | 427/386 |
| 3,605,798 | 9/1971 | Green et al. | 137/392 |
| 3,759,286 | 9/1973 | Page | 137/392 |
| 3,848,627 | 11/1974 | Page | 137/392 |
| 3,939,360 | 2/1976 | Jackson | 137/392 |
| 4,002,996 | 1/1977 | Klebanoff et al. | 137/392 |
| 4,191,677 | 3/1980 | Strand | 427/386 |
| 4,374,963 | 2/1983 | Morgan et al. | 427/386 |

FOREIGN PATENT DOCUMENTS 27973 of 1908 United Kingdom ................ 137/392

Primary Examiner—George L. Walton
Attorney, Agent, or Firm—David Ostfeld

[57] ABSTRACT

A probeless fluid level detector and controller is disclosed for use in monitoring and controlling the level of a conductive fluid within a container. The detector includes a multiple pin terminal strip intrusively mounted into the container. The strip is sealed to the container by a mixture of epoxy and container filings. The strip is electrically connected to a controller which controls the level of the container.

9 Claims, 2 Drawing Figures

PROBELESS FLUID LEVEL CONTROLLER

TECHNICAL FIELD AND BACKGROUND ART

A. Field of the Invention

The invention relates generally to devices for controlling and monitoring liquid levels.

B. Background

There are numerous varieties of devices and systems being used for the monitoring and control of fluctuating levels of fluids in vessels. Many of these devices use the conductive properties of the fluids contacting probe mounted contact points to cause a predetermined action by devices through the opening or closing of electrical circuits in response to the detected conduction in the fluid. Probes of different types suspended in the vessel and cut to a predetermined length for contact with the fluids are widely used. These probes are connected to devices outside the vessel with electrical circuits to terminals of control devices. See, for example, the control system supplied by Turner Controls, Inc., a copy of which is attached to this application. Further, see U.S. Pat. Nos. 3,759,286 to Page; 3,605,798 to Green, et al; 3,224,638 to Harrell, Jr; 2,766,406 to Schwarzkoff; 2,433,599 to Cohen; and 1,699,143 to Hill. Of these, Page, like a suggestion made to Mr. Charles Morgan by Mr. Larry Brown before the invention herein, shows a side mounted intrusive device through piping for swimming pool use. Mr. Brown had suggested using screws through the side of a water tank, or PVC pipe connected to it. Another person also suggested using epoxy and filings from the material to be sealed for viscosity for a sealant for intrusive device.

However, none of the art discloses incorporation of the electrical terminals directly through the vessel walls to permit precise level controls without the use of externally mounted probe holders for the contact probes inside the vessel, which require removal and modification for changes and/or additional devices, nor methods for sealing penetration of the terminals through the vessel walls to attain a fluid tight, as well as pressure tight device. Further, none of the art discloses a device as described above which allows also the capability of visual monitoring of the condition of the fluid in the vessel as well as the level of said fluid. This probeless method system permits easy and quick change of level of detection from outside the vessel to cause control action. Further, the use of a probeless level controller has the advantages of:

1. No guess work in cutting wires and attaching probe holders in attempting to achieve precise distances between control points on initial installations, adjusting operating levels and adding new equipment;

2. No "shutdown" time needed to disassemble and make changes, or to repair shorted probes or probe holders, or probes that become disengaged;

3. No water or condensate causing false signals from conventional probe holders, which arises frequently in inclement weather on systems using exterior mounted probe holders;

4. No exotic parts of machined pieces incorporated into construction that cause extended "shutdown" time for replacement if damaged;

5. No substantial difficulty with mounting inside a remote control building or outside with an optional heater and/or insulated box for protection against the elements; and 6. Regular cleaning may be accomplished by disconnecting a pipe union, removing a bushing in the bottom unit, washing with a sponge or brush, and flushing clean. Done on a regular basis, it should only require ten to fifteen minutes each time. (This is a very critical item due to the many minerals that collect on probe systems, which require much more down time periodically to clean or replace corroded probes. In many cases of system failure to operate in automatic mode, it is not the controller, but corroded or shorted probes.)

7. Ability to visually inspect quality and condition of fluids in the vessel, as well as visually check operation of automatic devices connected to system.

8. Ability to withdraw representative samples of fluid of the vessel directly from the controller piping.

DISCLOSURE OF THE INVENTION

An apparatus for level control is disclosed which includes a clear acrylic tube, preferably, that can be pressurized and used to control and visually monitor the fluid level of a vessel, such as a hydropneumatic tank. The tube may be of any construction or design. Such tanks may be hydropneumatic tanks in water booster plants, but the apparatus is adaptable to other vessels where fluctuating fluid levels require automatic devices to control these fluctuations. The apparatus may operate at high pressures, such as 120 psi working pressure.

The apparatus uses conductive properties of the fluids touching electrical contacts to signal automatic devices for required action to control, or indicate, the fluids at the desired levels.

The apparatus utilizes a terminal strip incorporated on the side of the tube. The terminals of the strip are connected to wires which are also connected to control devices. These terminals, when immersed in the conductive fluid, form, with the conductive fluid, a path for current flow in the wires. The terminals allow accurate selection of operating levels in the vessel in, for example, one-quarter inch increments. These levels can be changed, or devices added, in a matter of seconds without disassembly or "shutdown" of the vessel or controller by (1) disconnecting electrical power to the controller, (2) selecting terminals at the level desired, (3) connecting sensing wire to the terminals, and then (4) restoring power to the controller. Preferably an epoxy compound is used to bond and seal the terminals through the acrylic tube wall, which through its chemical bonding process causes the terminals to become a part of the tube.

BRIEF DESCRIPTION OF THE DRAWINGS

For a detailed description of the preferred embodiment of the invention, reference should be made to the following detailed description, taken in conjunction with the accompanying drawings, in which like parts are given like reference numerals, and wherein.

DESCRIPTION OF THE PREFERRED EMBODIMENT

Figure 1:
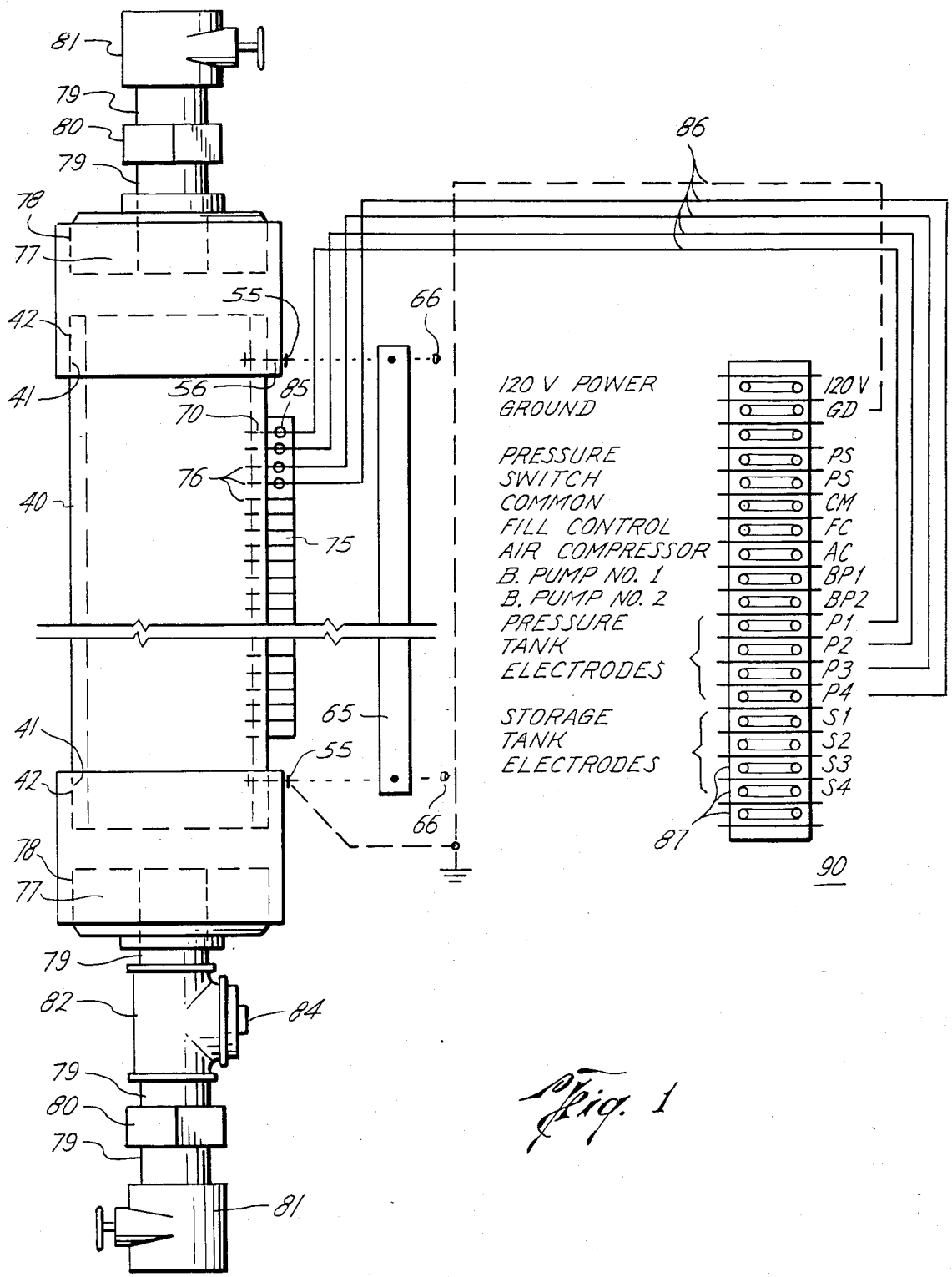
FIG. 1 is a side view of a controller, with the preferred embodiment of the electrical contacts in a control terminal strip through the wall of the control vessel and with electrical wires connected directly from the control terminal strip to connections of one of many automatic control devices available on the market today, such as shown by Turner Controls, Inc. attached to the accompanying portion of Memorandum of Art.

Referring to FIG. 1, a three inch diameter clear acrylic tube (40) with one-quarter inch wall thickness is machine threaded with threads (41) at each end suitable for attachment of a three inch threaded pipe coupling (42). The size, length and material of tube (40) can be as needed, so long as it is non-conductive. The choice of clear acrylic for the application illustrated herein is preferred for visual inspection of the fluids contained therein, however, opacity is permitted if desired. A three inch coupling (42) is threaded on each end of tube (40), and tightened sufficiently to prevent leakage. A, for example, one-fourth inch stainless steel bolt and nut (55) is installed through a hole (56) drilled through tube (40) and coupling (42), to prevent coupling (42) from turning on threaded ends of tube (40). This bolt (55) is sealed in the wall of tube (40) with an acrylic two part epoxy compound, such as Locktite Corporation, DURO® Item No. 80268, E-POX-E-5, TM with, for example, an equal part of powder of filings from the tube (40) mixed therein, which should yield a consistency of a thick paint. This mixture is applied to the threads of bolt (55) which seals the penetration through the wall of tube (40) in a solvent chemical bonding type process, thereby rendering the makeup of tube (40) a fluid tight as well as pressure tight vessel. Bolt (55) also serves as a grounding contact for automatic device electrical circuits, and as an attaching bolt for aluminum insulated shroud (65) with cap screws (66) connected to bolts (55). After assembly as described above, other than the attachment of shroud (65) thereto, holes (70) are drilled and tapped at, for example, one-quarter inch increments through the wall of tube (40). A terminal strip (75) is then attached with, for example, 0.50 ¾ inch long 440 stainless steel screws (76) at the one-quarter inch increments. These screws (76) penetrate the wall of tube (40) from outside to inside for contact with fluids within tube (40). The screws (76) are coated with acrylic mixture as described above with respect to bolt (55), for sealing the screws (76) within the wall of tube (40).

After assembly and sealing as described above, for example, a three inch by three-quarter inch threaded bushing (77) is threaded into coupling (42). Two threaded nipples (79), for example one inch, are used at each end to connect a threaded pipe union (80) between threaded bushing (77) and a top and bottom gate valve (81). A threaded tee (82) and an additional nipple (83) are also provided at the bottom connection between bushing (77) and union (80). A removable plug (84) is provided in tee (82) for draining and flushing the assembly.

Contact points or heads or small screws (85) on terminal strip (75) are provided and are electrically connected to screws (76). These heads (95) may be an integral part of the screw. Heads (85) are electrically connected by wires (86) to the terminals (87) mounted on a typical automatic control device (90) as required for preset action of device (90), as is well known in the art as discussed supra, such as the device illustrated at Turner Controls, Inc.

Figure 2:
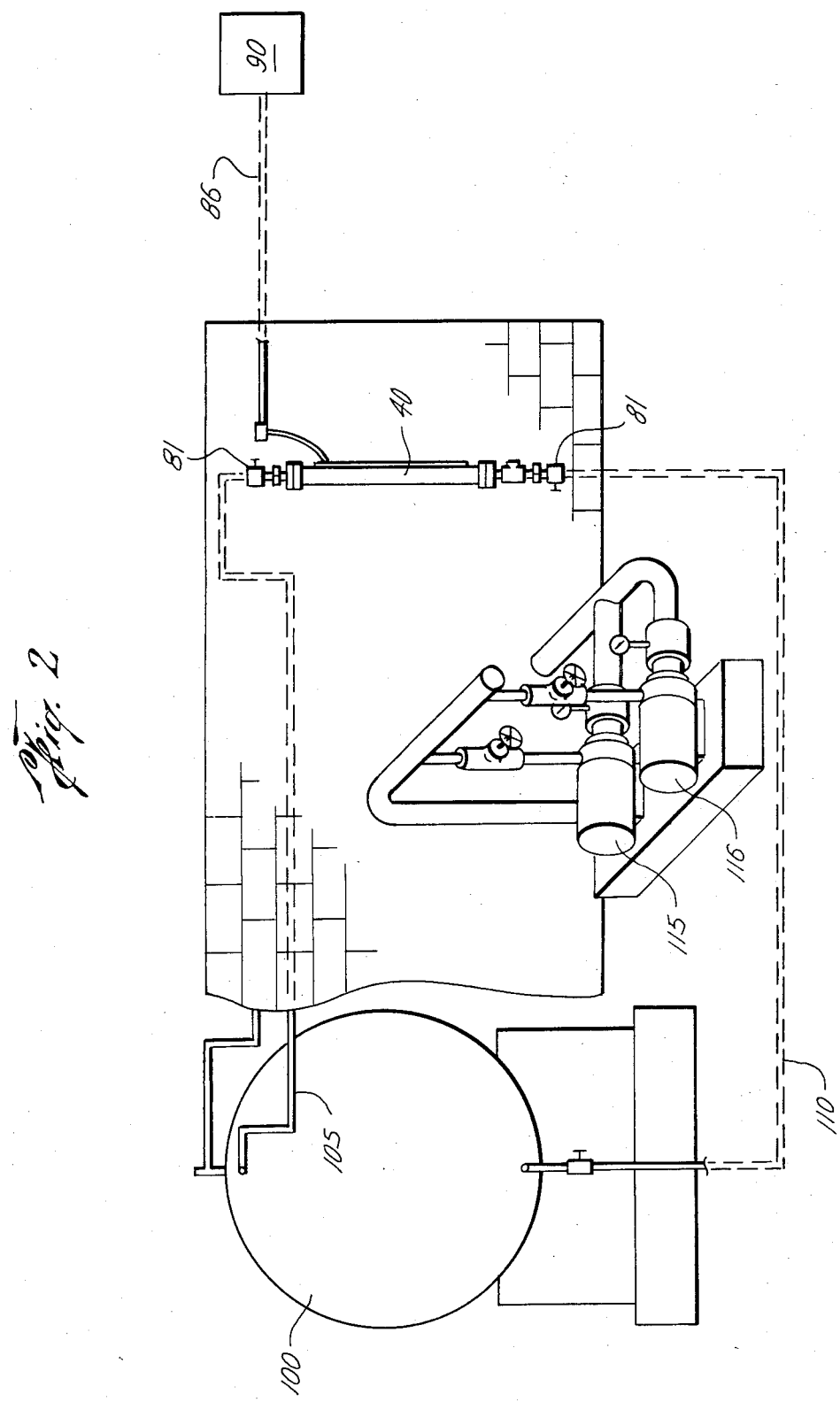
FIG. 2 is a drawing of the application of the controller referenced in FIG. 1, connected as referenced to an automatic control device, monitoring and controlling the fluid level and air balance of a hydropneumatic tank.

Referring to FIG. 2, in a typical installation air piping (105) is connected from the top of a hydropneumatic tank (100) to top valve (81). Fluid piping (110) is connected between bottom of tank (100) and bottom gate valve (81). The center of tube (40) is typically installed at same level as the center line of tank (100).

The desired top level of the fluid in tank (100) is selected with the corresponding contact point (76) on terminal strip (75), and connected with electrical wires (86), for example, to terminal (P-1) of terminals (87) on automatic device (90). Terminal GD of terminals (87) on device (90), for example, is connected to bolt (55) on tube (40) for a ground circuit, as shown on FIG. 1. The desired bottom level of fluid in tank (100) is selected with the corresponding contact point (76) on terminal strip (75) and connected with wires (80) to, for example, terminal P-3 of terminals (87) on automatic device (90).

When fluid reaches a level below the physical location of the contact point (76) selected for desired bottom level of fluid, there is breaking of the conductive circuit of the fluid between ground bolt (55) and the contact (76) selected for the low level which is connected to the terminal, for example, P-3 of terminals (87). This breaking of a conductive circuit causes a contact (not shown) of the automatic device (90) to commence operation of the pump (115) which causes more fluid to flow into tank 100. When fluid level via pump (115) is restored to the desired high level of the contact (76) selected for same, the conductive circuit formed by the connection, such as high level of contact (76) with high level contact P-1 (87) and ground, bolt (55), is completed again, and automatic device (90) stops pump (115). If the fluid level continues to fall after pump (115) is activated as described above, and an additional circuit between a second selected low contact point (76) and ground, bolt (55), is broken, automatic device (90) will start second pump (116) for back-up of pump (115) until high level contact point (76) is reached, as described above, at which event auto device (90) will stop both pumps (115, 116) as described above. Any number of pumps or devices such as alarms, warning devices, telemetering devices, telephones and the like can be connected to the controller by selecting the desired level for operation of each and connected to the corresponding contacts (76) and terminal strip (75).

The complete assembly of the components, as described, visibly and automatically monitors the level of fluid in tank (100) at any desired level by simply selecting corresponding contact points (76) on terminal strip (75) and connecting preselected terminals (85) to contacts (87) on automatic device (90).

Periodic cleaning of interior of tube (40) and contacts (76) will be needed, due to coating and possible buildups on contact points (76). This is done by disconnecting electrical power, not shown, to automatic device (90), disconnecting union (80), removing bushing (77), at top or bottom, with gate valves (81) closed. After removing, as detailed above, the inside of tube (40) and contacts (76) are brushed with a soft brush, not shown, and flushed clean. After brushing, the bushing (77) and union (80) are reconnected to tube (40). The gate valves (81) are then reopened substantially simultaneously two to three turns until fluid and air balance stabilizes. Power, not shown, is then restored to automatic device (90), and automatic device will then be returned to service.

Alternately, in lieu of using tapped and threaded holes (70) it is possible to use stainless nuts with rubber gaskets with the above described epoxy compound on screw (76) for sealing tube (40) for liquid tight and pressure tight construction within the spirit of the invention, although this is not preferable.

Because many varying and different emodiments may be made within the scope of the inventive concept herein taught including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A probeless level system for use in monitoring of a fluid within a fluid container having a wall comprising:
   a terminal strip mounted on the wall of the container;
   screw means located on said terminal strip and extending into the interior of the container through the wall for permitting multiple selections of levels to be monitored;
   seal means for forming a fluid and pressure tight seal between said screw means and the wall, said screw means and said seal means includes: screws; and mixture of epoxy and filings from the wall of the container, mixed to a consistency of thick paint; and wherein said mixture is applied to the interface of said screws with the wall of the container, which causes said screws to become chemically bonded to the wall of the container for forming said fluid and pressure tight seal between said screws and the wall.

2. The system of claim 1, wherein said mixture is of equal parts of epoxy and filings.

3. A control system of claim 1, wherein there is further included a level controller and conductive means for attaching said screws to said level controller.

4. A probeless level control system for use in monitoring and controlling the level of a conductive fluid within a container, comprising:
   a tube having a wall connection means for connecting said tube to the container of fluid;
   a terminal strip having a plurality of locations thereon attached to said tube;
   a first plurality of screws corresponding to said plurality of locations, said first plurality of screws extending through said strip and into the interior of said tube through said wall;
   seal means for sealing the interface between said first plurality of screws and said wall, said seal means including a mixture of equal parts of epoxy and filings from said wall mixed to a consistency of thick paint and applied to the interface between said screws and said wall for forming fluid and pressure tight seals between said screws and said wall;
   a level controller;
   conductive means for electrically connecting preselected ones of said screws with said level controller.

5. The system of claim 4, wherein one of said screws is connected to said connection means.

6. The system of claim 5, wherein said connection means includes:
   a valve located at each end of said tube;
   means for connecting said valves to said tube.

7. A sealing mixture for use for applying to intrusive devices connected with a container containing fluid under pressure to seal the interface between wall of the devices and the container comprising:
   an epoxy compound;
   filings from the wall of the container;
   said epoxy compound and said filings mixed to the consistency of thick paint and for applicaion to the devices for forming fluid and pressure tight seals between the devices and the wall of the container.

8. The mixture of claim 7, wherein said epoxy compound is a two-part compound and there is an equal part of said filings and said epoxy.

9. The mixture of claim 8, wherein said epoxy compound is Locktite Corporation, DURO TM, Item No. 80268, E-POX-E5 ®, a two component compound.

* * * * *